United States Patent
Simon

[19]

[11] Patent Number: 6,139,436
[45] Date of Patent: Oct. 31, 2000

[54] COUPLING FOR A FUEL INJECTION PUMP

[75] Inventor: Helmut Simon, Goeppingen, Germany

[73] Assignee: Robert Bosch GmbH, Stuttgart, Germany

[21] Appl. No.: 08/860,587

[22] PCT Filed: Oct. 22, 1996

[86] PCT No.: PCT/DE96/02002

§ 371 Date: Aug. 27, 1997

§ 102(e) Date: Aug. 27, 1997

[87] PCT Pub. No.: WO97/17537

PCT Pub. Date: May 15, 1997

[30] Foreign Application Priority Data

Nov. 8, 1995 [DE] Germany .......................... 195 41 606

[51] Int. Cl.[7] ........................................................ F16D 3/04
[52] U.S. Cl. ............................................ 464/103; 464/167
[58] Field of Search ................................. 464/73, 74, 102, 464/103, 167

[56] References Cited

U.S. PATENT DOCUMENTS

| | | | |
|---|---|---|---|
| 1,027,520 | 5/1912 | Blood | 464/103 |
| 1,413,117 | 4/1922 | Higgins . | |
| 1,648,078 | 11/1927 | Thompson . | |
| 1,865,950 | 7/1932 | Petskeyes | 464/167 X |
| 1,907,447 | 5/1933 | Schilitz | 464/103 X |
| 2,333,611 | 11/1943 | Wolf | 464/103 |
| 3,454,283 | 7/1969 | Benjamin et al. | 464/103 |
| 3,606,768 | 9/1971 | Wildhaber | 464/103 |
| 3,668,892 | 6/1972 | Alsch | 464/73 |

FOREIGN PATENT DOCUMENTS

| | | | |
|---|---|---|---|
| 62-110026 | 5/1987 | Japan | 464/102 |
| 4-1244-1 | 4/1992 | Japan | 464/102 |
| 6-42473 | 2/1994 | Japan | 464/102 |
| 1670217 | 8/1991 | U.S.S.R. | 464/103 |
| 2152173 | 7/1985 | United Kingdom | 464/102 |

*Primary Examiner*—Lynne H. Browne
*Assistant Examiner*—Greg Binda
*Attorney, Agent, or Firm*—Ronald E. Greigg; Edwin E. Greigg

[57] ABSTRACT

A fuel injection pump having a pump-and-distributor member driven by a drive shaft via an Oldham coupling. The Oldham coupling has a cross disk with four arms protruding at right angles from one another. In each of the arms, one roller is supported rotatably as a roller body about a radial axis. On the drive disk and the eccentric disk, one pair of claws is mounted, offset from one another by 90°. With these claws, the drive shaft and the eccentric disk, when the Oldham coupling is mounted, engage the interstices between the arms and the cross disk. The engagement is such that the claws each rest axially movably but practically without play on the rollers of the cross disk. In operation, the friction and noise of the Oldham coupling are reduced.

7 Claims, 1 Drawing Sheet

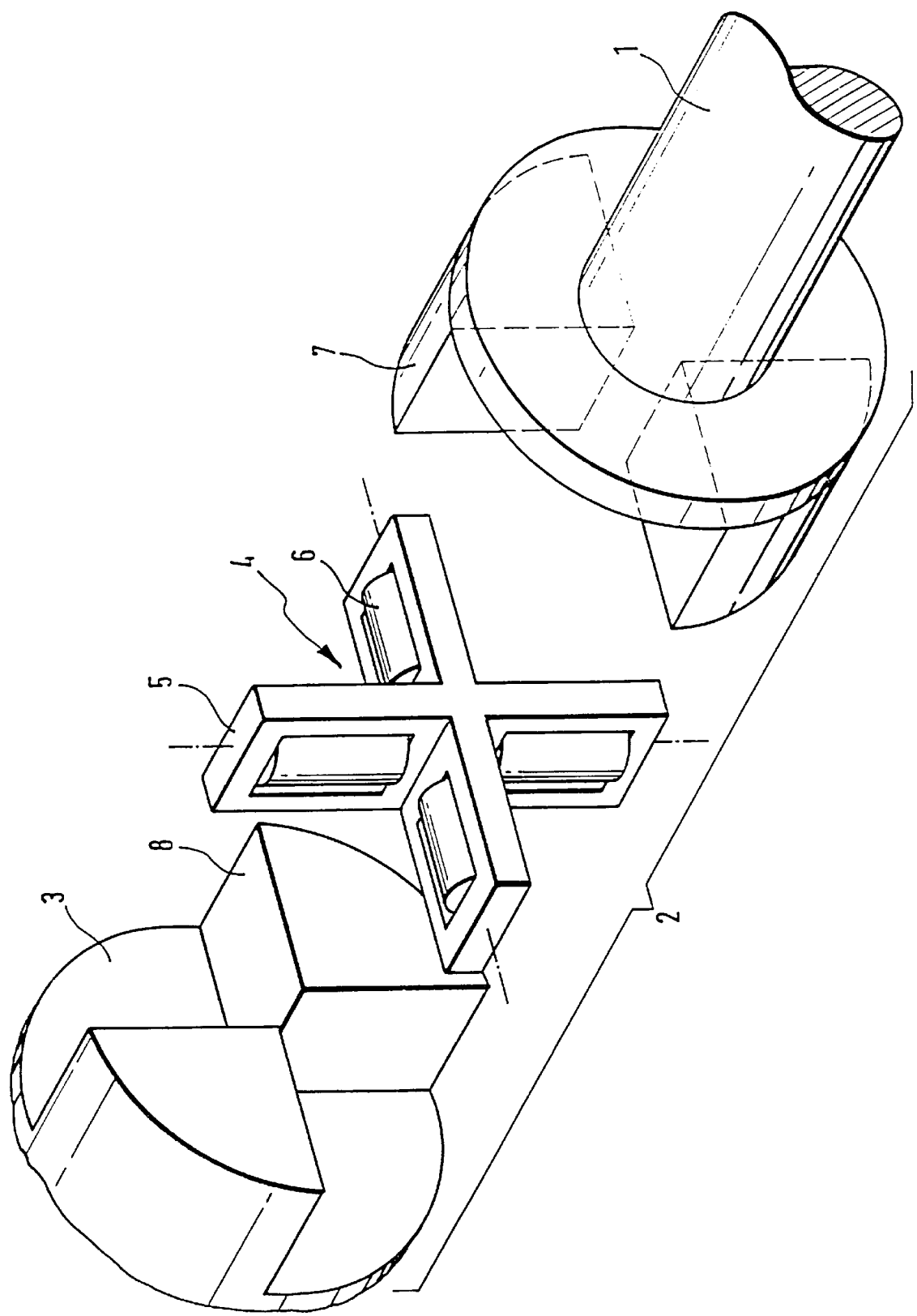

COUPLING FOR A FUEL INJECTION PUMP

PRIOR ART

The invention relates to a fuel injection pump for internal combustion engines. In a pump of this type known from German Published, Examined Patent Application DE-AS 21 58 689, the cross disk of the Oldham coupling, which transmits the drive moment from the claws of the drive shaft to the claws of the pump-and-distributor member, is disposed freely movably between the pairs of claws in the axial direction.

ADVANTAGES OF THE INVENTION

In the fuel injection pump according to the invention, the wear resistance of the bearing faces between the cross disk and the claws engaging it is increased. Moreover, very high transmissible moments between the claws and the cross disk are possible. In addition, noise abatement is attained in the Oldham coupling. The above advantages are due to the fact that the previous sliding friction between the claws that engage the cross disk is replaced according to the invention by a rolling friction.

In the embodiment according to the invention, the cross disk can be made lighter in weight and more economical than before.

In an embodiment set forth herein, the cross disk is embodied as an easily manufactured cage for roller bodies to be supported in it. The cross disk can take the form of a cross, with simple arms abutting one another at right angles. This cross then has the function of the roller bearing cage, in which the individual roller bodies are supported in the four arms of the cross. The roller bodies extend through the arms in the circumferential direction of the cross disk, so that these roller bodies simultaneously engage the various claws which in turn engage the drive and driven sides. On a relative displacement of the claws on the drive and driven sides with respect to one another, the cross disk also executes axial motions.

Since the force transmission between the claws on the drive and driven sides is effected solely via the roller bodies in the cross disk, the material for the cross disk, which now is merely a roller bearing cage, can be different from that of the roller bodies. For instance, the cross disk acting as a roller bearing cage can advantageously be made of plastic. According to the invention, the roller bodies are rollers.

The claws on the drive and driven sides, advantageously take the form of triangular segments for the sake of a radially positive engagement with the recesses between the arms of the roller bearing cage of the cross disk.

BRIEF DESCRIPTION OF THE DRAWING

The drawing shows an Oldham coupling in an exploded view, in which the carriers of the claws on the drive and driven sides are shown only schematically.

DESCRIPTION OF AN EXEMPLARY EMBODIMENT

In a housing, not shown, of a fuel injection pump a drive shaft 1 is rotatably supported. Via an Oldham coupling 2, the drive shaft 1 is coupled via a cross disk 4 to drive a pumping and distributor member via an eccentric disk 3.

The Oldham coupling 2 has a cross disk 4, with four arms 5 protruding at right angles from one another. In each of the arms 5, one roller 6 is supported rotatably as a roller body about a radial axis. On the drive disk 1 and the eccentric disk 3, one pair of claws 7 and 8 each is mounted, offset from one another by 90°. With these claws 7 and 8, the drive shaft 1 and the eccentric disk 3, when the Oldham coupling 2 is mounted, engage the interstices between the arms 5 and the cross disk 4. The engagement is such that the claws 7 and 8 each rest axially movably but practically without play on the rollers 6 of the cross disk 4.

In the course of the reciprocating motions of the eccentric disk 3 occurring during operation of the fuel injection pump, the cross disk 4 executes axial motions, by which the transmission of moment between the claws 7 and 8 of the drive shaft 1 and eccentric disk 3, respectively, is effective via axial motions that have rolling friction.

In terms of strength, the claws 7 and 8 can favorably be embodied as relatively large triangular segments. The cross disk itself, as can be appreciated, is simple to produce, especially from plastic, since the arms 5 act merely as position holders for the rollers 6 and thus practically need not transmit any forces. Hence the cross disk 4 is not only simple to make but can also be made extremely light in weight.

The foregoing relates to preferred exemplary embodiments of the invention, it being understood that other variants and embodiments thereof are possible within the spirit and scope of the invention, the latter being defined by the appended claims.

What is claimed is:

1. A coupling for a fuel injection pump comprising a drive shaft (1), an eccentric disk (3) which drives an axially reciprocating and simultaneously rotating pump-and-distributor member, an Oldham coupling (2) that connects the drive shaft to the pump-and-distributor member via the eccentric disk (3), said Oldham coupling has a first pair of claws (7) on the drive shaft (1) on a drive side of the pump and a second pair of claws (8) on the eccentric disk (3) on the driven side of the pump opposite to said first pair of claws, a cross disk (4) formed by radial arms is disposed between said first and second pairs of claws for guiding the opposed pairs of claws (7, 8) in positively adapted claw receptacles, the cross disk (4) comprises four radially oriented arms (5), abutting one another centrally at right angles, with said claw receptacles located between the arms for the first and second pairs of claws (7, 8), said first and second pairs of the claws (7, 8) are supported by roller bearings within cages of the cross disk (4), and the roller bearings (6) are supported in the arms (5), rotatable about a radial axis thereof with a portion of the roller bearings protruding past side surfaces of the cross disk (4).

2. A coupling for a fuel injection pump as set forth in claim 1, in which the roller bearing cages of the cross disks (4) are formed with plastic.

3. A coupling for a fuel injection pump as set forth in claim 2, in which the rolled bearings are rollers (6).

4. A coupling for a fuel injection pump as set forth in claim 2, in which said first and second pairs of claws (7, 8), on the drive and driven sides are embodied as triangular segments that radially positively engage interstices between the radial arms (5) of the cross disk (4).

5. A coupling for a fuel injection pump as set forth in claim 1, in which, the roller bearings are rollers (6).

6. A coupling for a fuel injection pump as set forth in claim 5, in which said first and second pairs of claws (7, 8), on the drive and driven sides are embodied as triangular segments that radially positively engage interstices between the radial arms (5) of the cross disk (4).

7. A coupling for a fuel injection pump as set forth in claim 7, in which said first and second pairs of claws (7, 8), on the drive and driven sides are embodied as triangular segments that radially positively engage interstices between the radial arms (5) of the cross disk (4).

\* \* \* \* \*